US012673627B2

(12) United States Patent
Cole

(10) Patent No.: US 12,673,627 B2
(45) Date of Patent: Jul. 7, 2026

(54) REPLACEMENT VEHICLE BODY PANEL WITH INTEGRAL ACCESSORY MOUNTS

(71) Applicant: NOMADYN INC., Gimli (CA)

(72) Inventor: Michael T. Cole, Gimli (CA)

(73) Assignee: Nomadyn Inc., Gimli (CA)

( * ) Notice: Subject to any disclaimer, the term of this patent is extended or adjusted under 35 U.S.C. 154(b) by 222 days.

(21) Appl. No.: 18/503,580

(22) Filed: Nov. 7, 2023

(65) Prior Publication Data

US 2024/0198934 A1      Jun. 20, 2024

Related U.S. Application Data

(60) Provisional application No. 63/433,914, filed on Dec. 20, 2022.

(51) Int. Cl.
B60R 16/03       (2006.01)
B62D 25/08       (2006.01)

(52) U.S. Cl.
CPC .............. B60R 16/03 (2013.01); B62D 25/08 (2013.01)

(58) Field of Classification Search
None
See application file for complete search history.

(56) References Cited

U.S. PATENT DOCUMENTS

| | | | |
|---|---|---|---|
| 10,400,977 B2 * | 9/2019 | Maskiw ................... | F21S 41/50 |
| 10,688,946 B1 * | 6/2020 | Bove ................... | B60R 16/0238 |
| 2002/0197909 A1 * | 12/2002 | Andrieu ................. | H01R 33/09 |
| | | | 439/535 |
| 2006/0191206 A1 * | 8/2006 | Mooney ..................... | B60J 5/06 |
| | | | 49/502 |
| 2014/0268855 A1 * | 9/2014 | Gerardo ................. | F21S 43/19 |
| | | | 362/520 |
| 2023/0331149 A1 * | 10/2023 | Vander Sluis ............ | F21V 5/04 |
| 2023/0387638 A1 * | 11/2023 | Flores Becerril ...... | H01R 27/00 |
| 2024/0302013 A1 * | 9/2024 | Hager ................ | B29D 11/0074 |
| 2024/0397637 A1 * | 11/2024 | Cosgriff ............. | B60R 16/0239 |

* cited by examiner

*Primary Examiner* — Christopher E Dunay
(74) *Attorney, Agent, or Firm* — Ryan W. Dupuis; Kyle R. Satterthwaite; Ade & Company Inc.

(57)      ABSTRACT

A body panel apparatus, for mounting various accessories onto a vehicle, has a panel body and mounts to mount in place of an existing body panel of the vehicle. The apparatus can include a light adapter plate to support a lighting assembly on the panel body in alignment with an aperture within a protrusion formed on the panel body by fastening the lighting assembly to the plate and separately fastening the plate to the panel body. The body panel may include an inwardly recessed socket with a mounting aperture at the inner end of the socket to receive a compressed air coupler mounted therein. The body panel may also include a removable breakout section in proximity to internal mounting posts to support an outlet adapter plate that supports an electrical outlet thereon so that the electrical outlet is externally accessible through the removed breakout section.

12 Claims, 10 Drawing Sheets

REPLACEMENT VEHICLE BODY PANEL WITH INTEGRAL ACCESSORY MOUNTS

This application claims the benefit under 35 U.S.C. 119(e) of U.S. provisional application Ser. No. 63/433,914, filed Dec. 20, 2023.

FIELD OF THE INVENTION

The present invention relates to a body panel arranged to replace an existing body panel on a vehicle body, and more particularly the present invention relates to a vehicle body panel including integral mounts to support one or more accessories thereon, for example a spotlight, a compressed air coupler, and/or an electrical outlet.

BACKGROUND

When driving vehicles off-road or in remote areas it is desirable to support auxiliary lighting on the vehicle to assist in navigating the vehicle. This is typically accomplished by mounting a lighting assembly externally on the vehicle. Externally mounted lighting assemblies tend to protrude in a manner that the lighting assembly can be easily caught or damaged by debris encountered while driving the vehicle off-road.

SUMMARY OF THE INVENTION

According to one aspect of the invention there is provided a body panel apparatus for mounting a lighting assembly onto a vehicle in place of an existing panel mounted on existing mounts of the vehicle wherein the lighting assembly includes a housing having a lens at a forward end of the housing and a mounting flange with fastener apertures therein about the lens at the forward end of the housing, the body panel apparatus comprising:

a panel body having an exterior surface and an opposing interior surface;

a plurality of panel mounts on the panel body arranged to mount the panel body on said existing mounts of the vehicle such that said exterior surface forms a portion of an exterior body surface of the vehicle;

a light protrusion formed on the panel body to protrude outwardly from the exterior surface towards an end surface at a distal end of the light protrusion;

a light aperture formed in the end surface of the light protrusion;

a plurality of light mounting posts integrally formed on the interior surface of the panel body to protrude inwardly from the interior surface at spaced positions about the light aperture;

a light adapter plate mounted onto the light mounting posts at a location spaced inwardly from the light aperture in the end surface of the light protrusion; and a plurality of adapter posts mounted on the light adapter plate to extend outwardly towards distal ends in proximity to the end surface of the light protrusion such that the adapter posts are arranged to support mounting flange of the lighting assembly thereon using fasteners coupled to the adapter posts through the fastener apertures in the mounting flange when the lens of the lighting assembly is adjacent to and aligned with the light aperture.

In this instance, the body panel apparatus allows a lighting assembly to be supported on a vehicle to project light laterally to one side of the vehicle while the lighting assembly remains protected at an interior side of the body of the vehicle to protect the components of the lighting assembly.

The light adapter plate is preferably oriented parallel to the end surface of the light protrusion locating the light aperture therein.

The light mounting posts preferably have different lengths between the interior surface of the panel body and the light adapter plate.

Preferably the end surface of the light protrusion locating the light aperture therein is parallel to a forward rolling direction of the vehicle.

The light aperture may be sized and shaped relative to the lens such that a peripheral rim on the panel body about the light aperture is arranged to fully conceal the housing of the lighting assembly.

In the illustrated embodiment, a perimeter shape of the light aperture defines four lobes evenly spaced apart from one another in a circumferential direction about the light aperture.

The light adapter plate may include a rear aperture formed therein arranged to receive a portion of the housing of the lighting assembly protruding therethrough in a mounted position of the lighting assembly on the light adapter plate.

The apparatus may further comprise (i) a socket on the panel body comprising a socket opening in the exterior surface and socket walls about the socket opening protruding inwardly from the interior surface to an inner end surface at a distal end of the socket, and (ii) a mounting aperture formed in the end surface of the socket so as to be arranged to receive a compressed air coupler mounted therein such that the compressed air coupler is at least partly recessed relative to the exterior surface of the panel body. Preferably a drain hole is provided in the socket walls at a bottom of the socket. The socket may be spaced forwardly of the light protrusion in a forward rolling direction of the vehicle. The apparatus may be used in combination with the compressed air coupler mounted in the mounting aperture in the end surface of the socket and a compressed air supply line connected to the compressed air coupler at an interior of the panel body.

The apparatus is arranged for use with an electrical outlet including a housing having an electrical connection at a forward end of the housing and mounting apertures in the housing at a location rearwardly of the electrical connection. In this instance, the apparatus preferably further includes (i) a breakout section formed in the panel body and defined by a line of weakness formed on the interior surface to extend about a boundary of the breakout section, (ii) a plurality of outlet mounting posts integrally formed on the interior surface of the panel body to protrude inwardly from the interior surface in proximity to the breakout section, and (iii) an outlet adapter plate having a first flange mounted onto the outlet mounting posts and a second flange protruding inwardly from the interior surface of the panel body, wherein the second flange includes a plurality of mounting apertures therein arranged for alignment with the mounting apertures in the housing of the electrical outlet such that the second flange is arranged to support the housing of the electrical outlet fastened thereon when the electrical connection at the forward end of the housing is adjacent to and aligned with the breakout section.

The exterior surface of the panel body may include a first portion spanning an exterior of the breakout section and a second portion surrounding the breakout section, in which the exterior surface of the panel body is smooth, continuous and uninterrupted from the first portion to the second portion of the exterior surface.

The breakout section is preferably spaced forwardly of the light protrusion in a forward rolling direction of the vehicle.

The outlet adapter plate is preferably arranged to support the electrical outlet thereon such that the electrical connection at the forward end of the housing is spaced inwardly from the interior surface of the panel body.

The mounting apertures in the second flange of the outlet adapter plate are preferably aligned in a row extending inwardly from the panel body such that the outlet adapter plate is arranged to support the electrical outlet thereon at an adjustable spacing relative to the panel body.

The outlet mounting posts are preferably located above the breakout section of the panel body.

According to a second aspect of the present invention there is provided a body panel apparatus for mounting a compressed air coupler onto a vehicle in place of an existing panel mounted on existing mounts of the vehicle, the body panel apparatus comprising:

a panel body having an exterior surface and an opposing interior surface;

a plurality of panel mounts on the panel body arranged to mount the panel body on said existing mounts of the vehicle such that said exterior surface forms a portion of an exterior body surface of the vehicle;

a socket on the panel body comprising a socket opening in the exterior surface and socket walls about the socket opening protruding inwardly from the interior surface to an inner end surface at a distal end of the socket;

a mounting aperture formed in the end surface of the socket so as to be arranged to receive the compressed air coupler mounted therein such that the compressed air coupler is at least partly recessed relative to the exterior surface of the panel body.

In this instance, the body panel apparatus allows a compressed air coupler to be supported is an accessible location at one side of the vehicle while the source of compressed air remains protected at an interior side of the body of the vehicle.

Preferably a drain hole is provided in the socket walls at a bottom of the socket.

According to a further aspect of the present invention there is provided a body panel apparatus for mounting an electrical outlet onto a vehicle in place of an existing panel mounted on existing mounts of the vehicle wherein the electrical outlet includes a housing having an electrical connection at a forward end of the housing and mounting apertures in the housing at a location rearwardly of the electrical connection, the body panel apparatus comprising:

a panel body having an exterior surface and an opposing interior surface, the panel body including a breakout section defined by a line of weakness formed on the interior surface to extend about a boundary of the breakout section;

a plurality of panel mounts on the panel body arranged to mount the panel body on said existing mounts of the vehicle such that said exterior surface forms a portion of an exterior body surface of the vehicle;

a plurality of outlet mounting posts integrally formed on the interior surface of the panel body to protrude inwardly from the interior surface in proximity to the breakout section; and an outlet adapter plate having a first flange mounted onto the outlet mounting posts and a second flange protruding inwardly from the interior surface of the panel body, the second flange including a plurality of mounting apertures therein arranged for alignment with the mounting apertures in the housing of the electrical outlet such that the second flange is arranged to support the housing of the electrical outlet fastened thereon when the electrical connection at the forward end of the housing is adjacent to and aligned with the breakout section.

In this instance, the body panel apparatus allows an auxiliary electrical outlet to be supported in an externally accessible location at one side of the vehicle while the electrical outlet remains protected at an interior side of the body of the vehicle.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
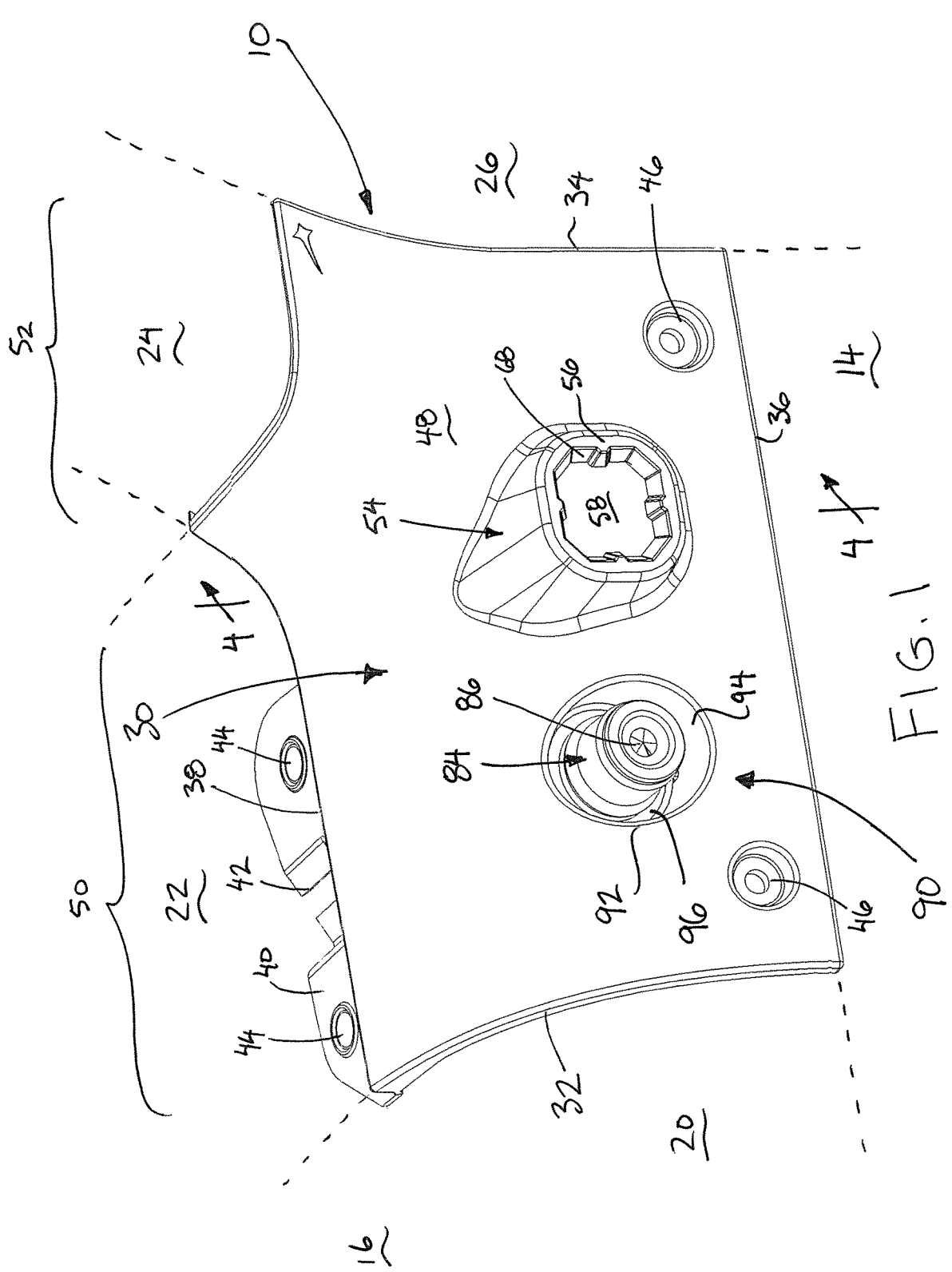
FIG. 1 is an exterior perspective view of a first embodiment of the body panel apparatus for use on a left side of a vehicle.
Figure 2:
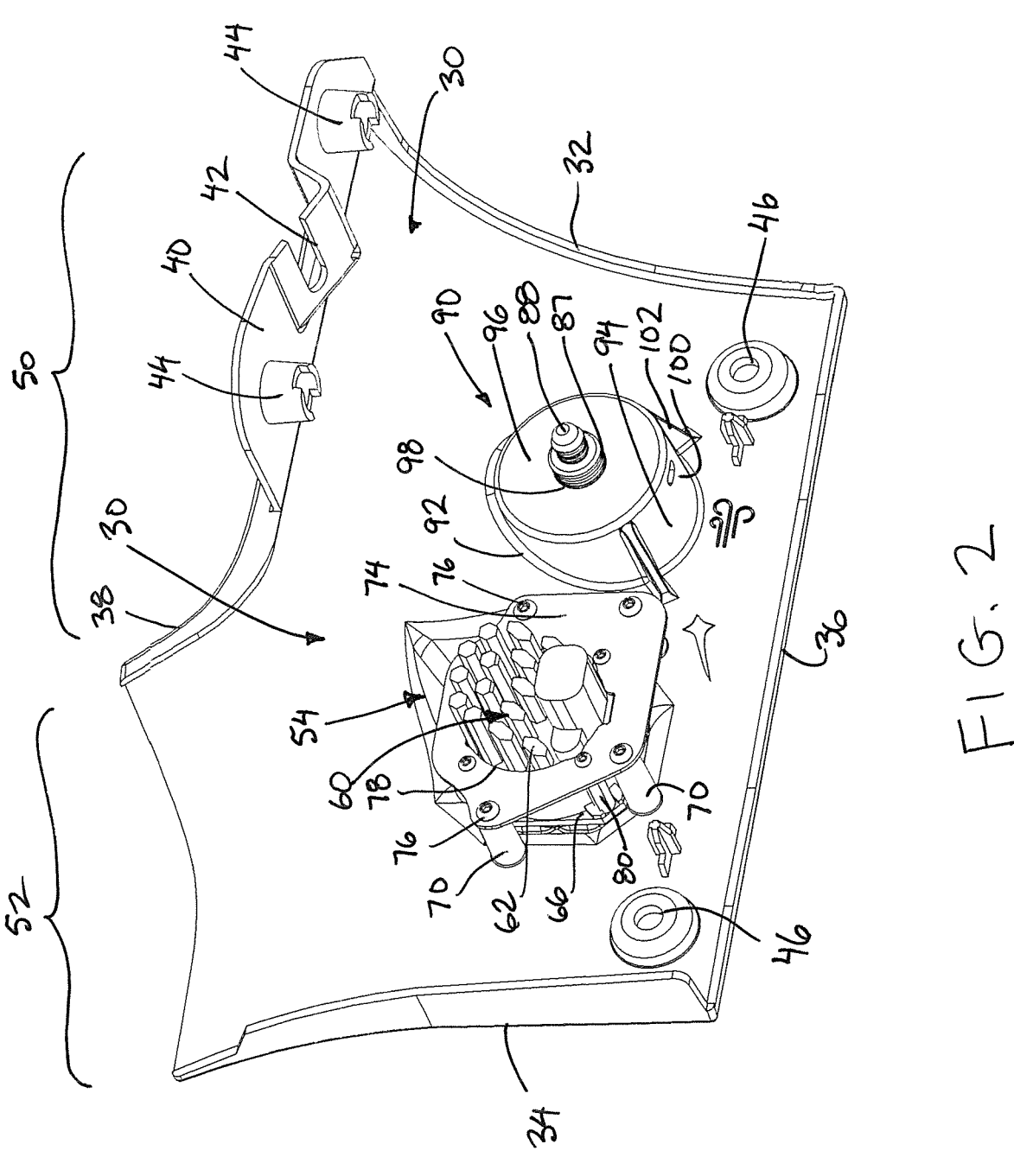
FIG. 2 is an interior perspective view of the body panel apparatus according to the embodiment of FIG. 1.
Figure 3:
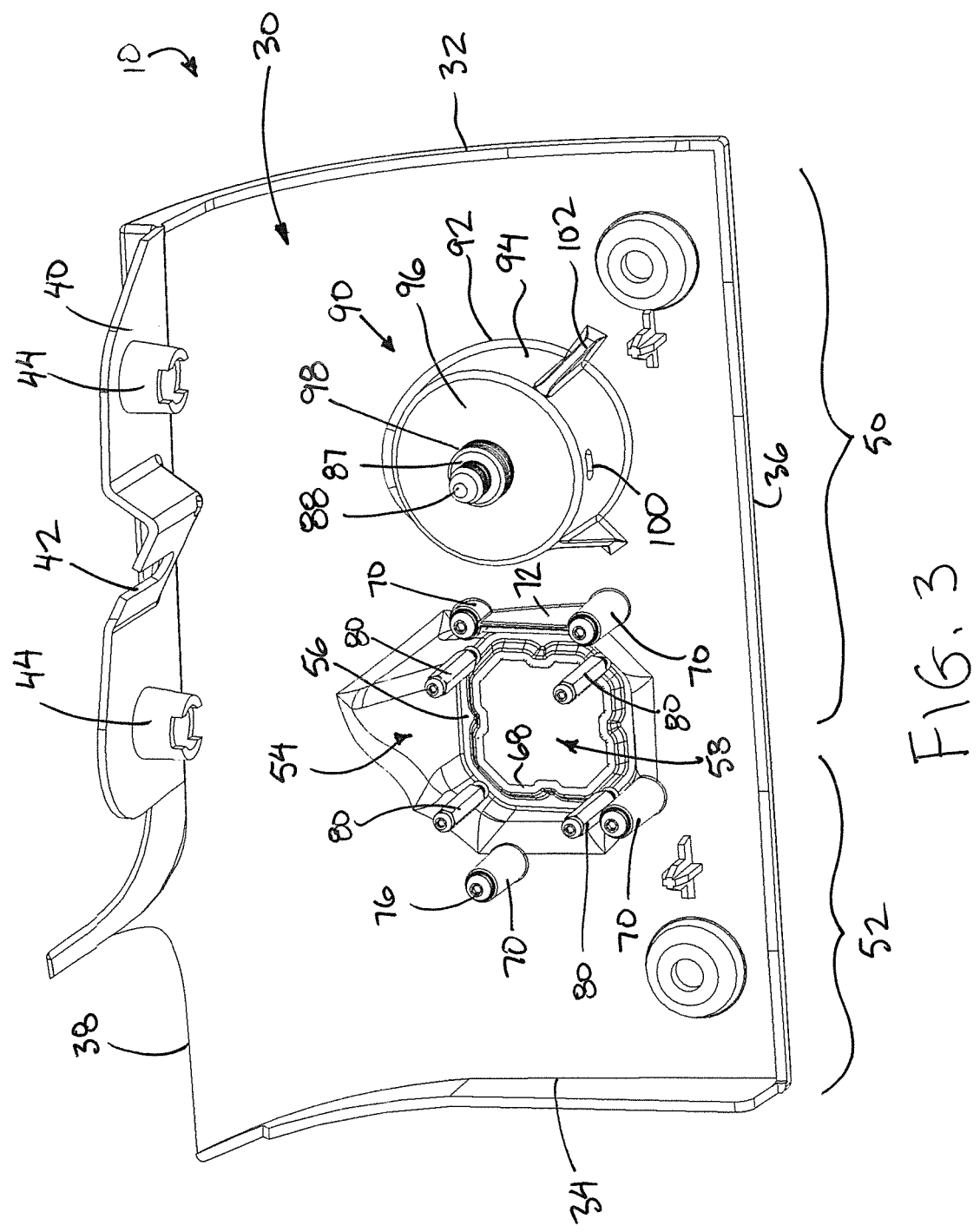
FIG. 3 is another interior perspective view of the body panel apparatus according to the embodiment of FIG. 1 in which the adapter plate and the lighting assembly have been removed for illustrative purposes.
Figure 4:
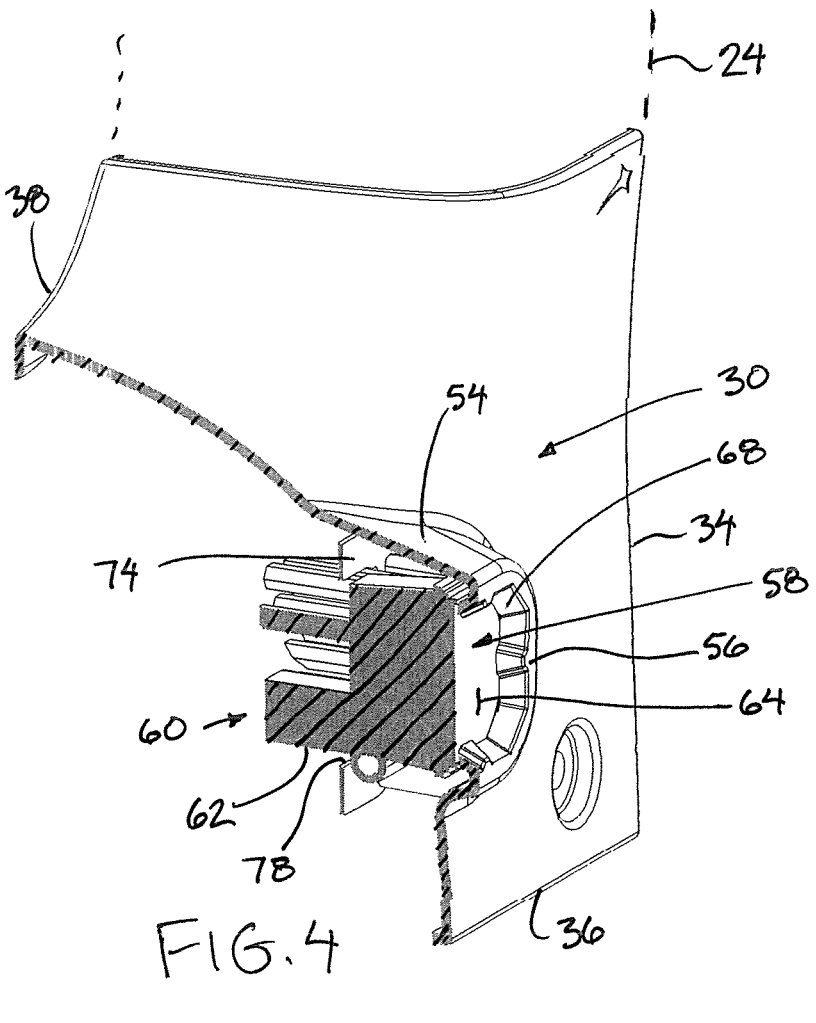
FIG. 4 is a sectional view along the line 4-4 in FIG. 1.
Figure 5:
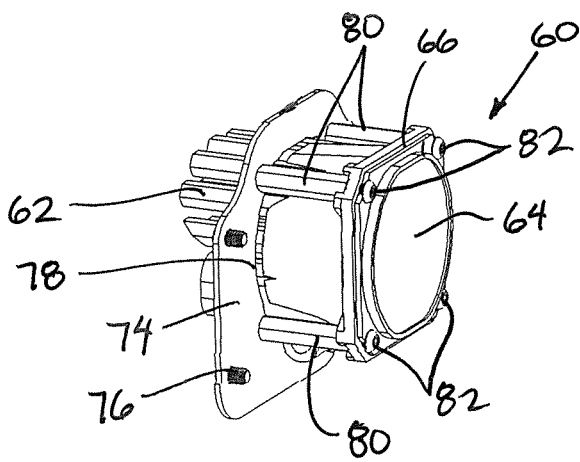
FIG. 5 is a perspective view of the adapter plate and the lighting assembly of the body panel apparatus according to the embodiment of FIG. 1 showing an exterior side of the lighting assembly when removed from the panel body.
Figure 6:
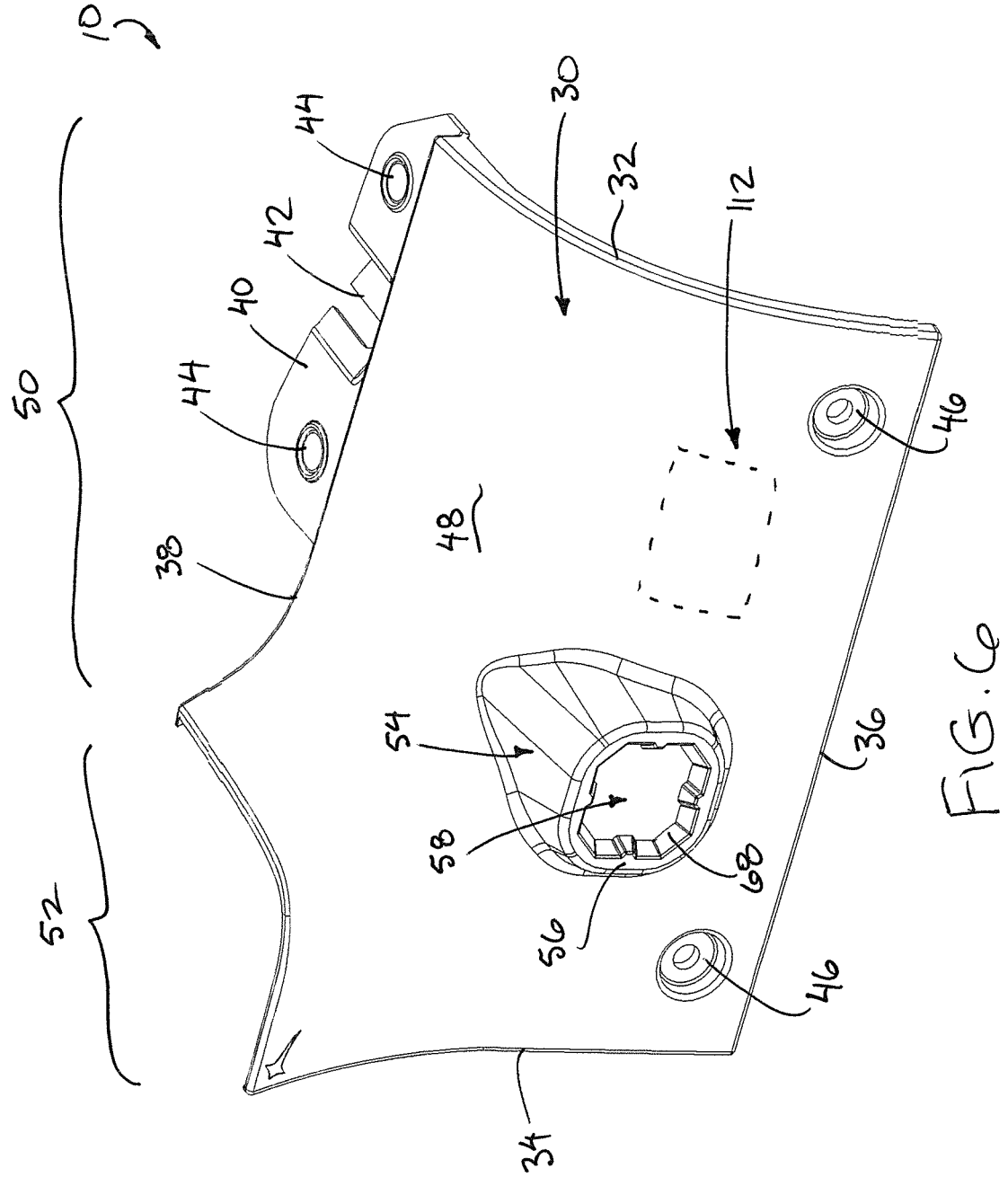
FIG. 6 is an exterior perspective view of a second embodiment of the body panel apparatus for use on a right side of a vehicle.
Figure 7:
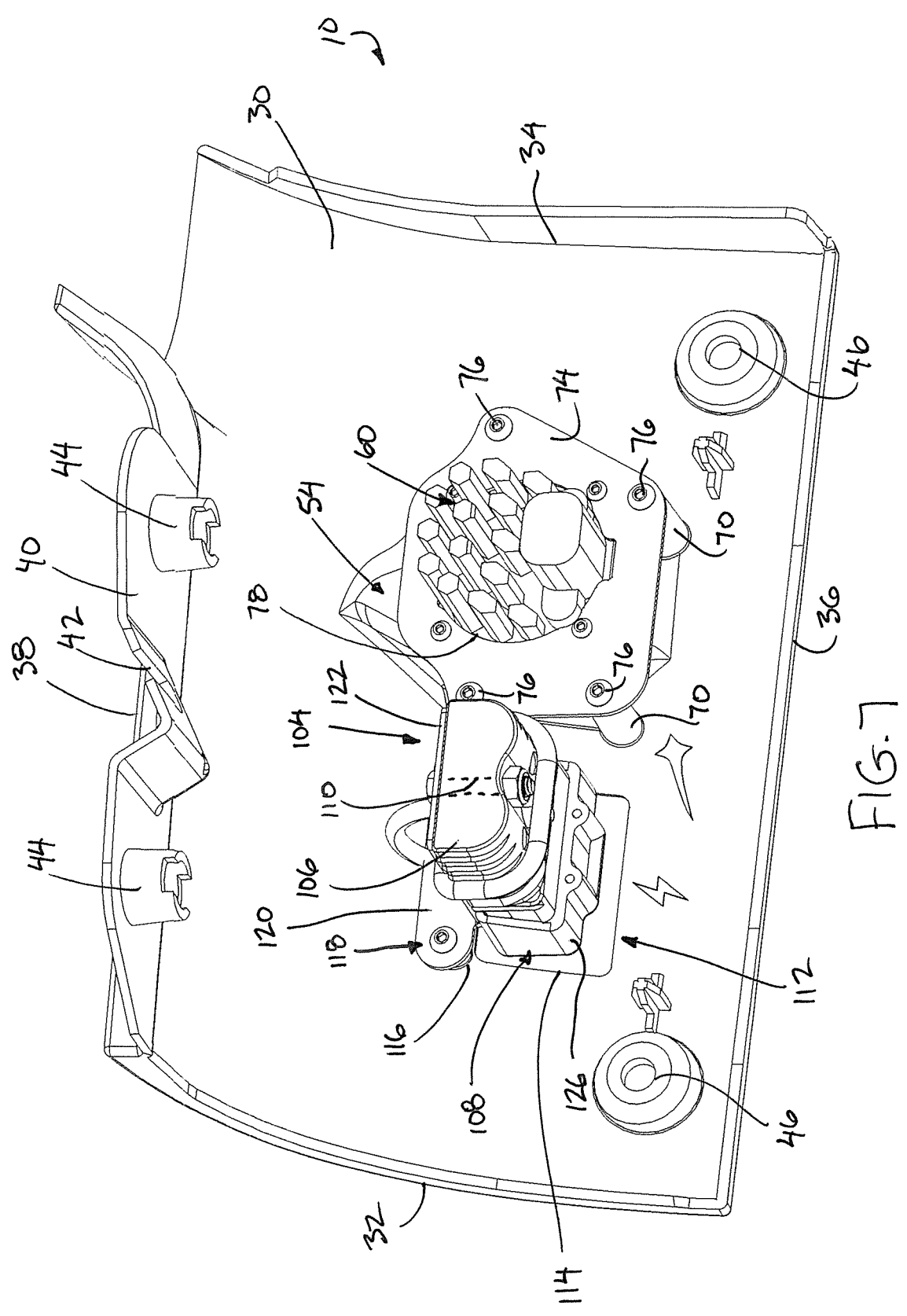
FIG. 7 is an interior perspective view of the body panel apparatus according to the embodiment of FIG. 6.
Figure 8:
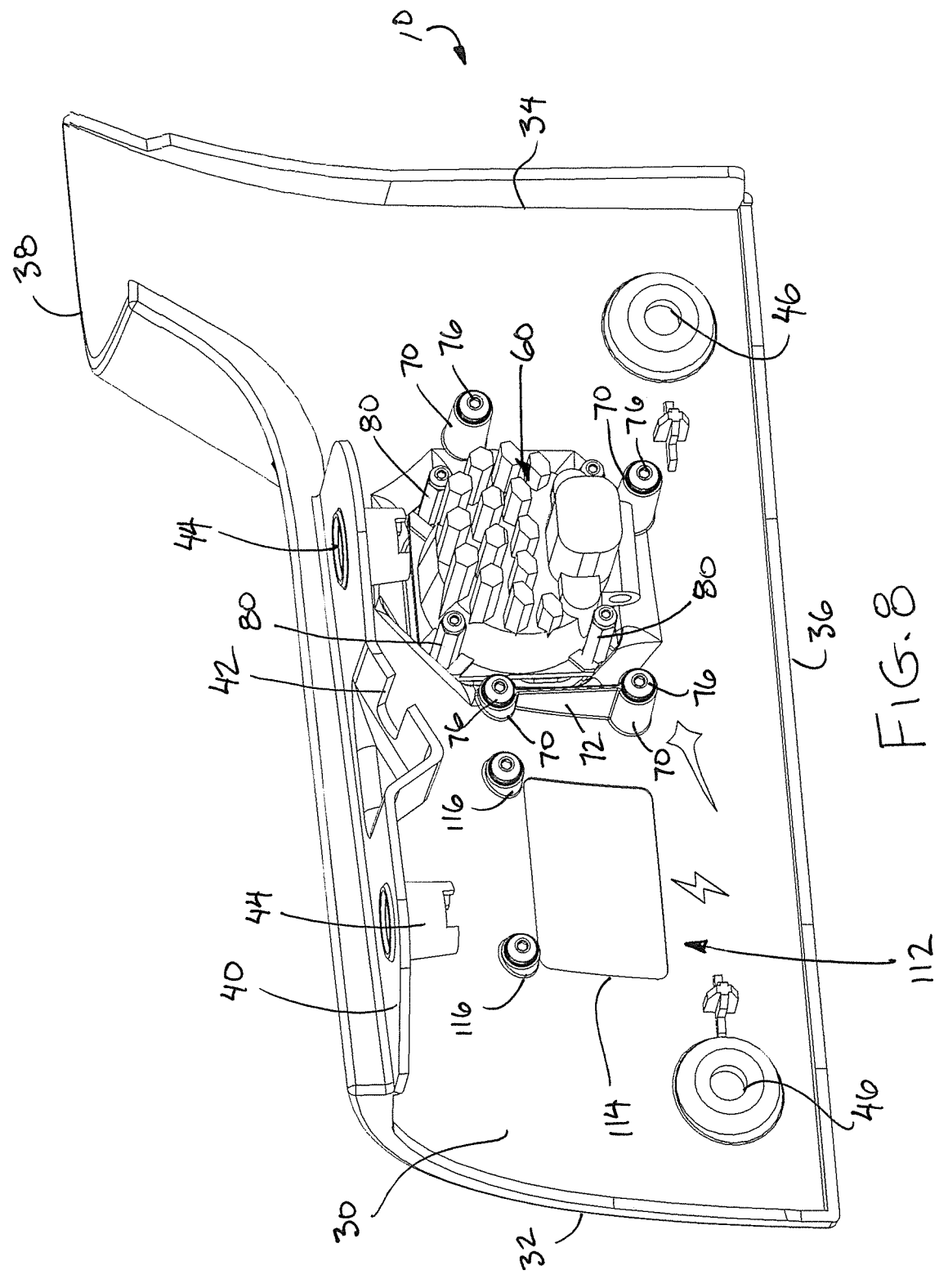
FIG. 8 is another interior perspective view of the body panel apparatus according to the embodiment of FIG. 6 in which the light adapter plate and outlet adapter plate supporting the electrical outlet have been removed for illustrative purposes.
Figure 9:
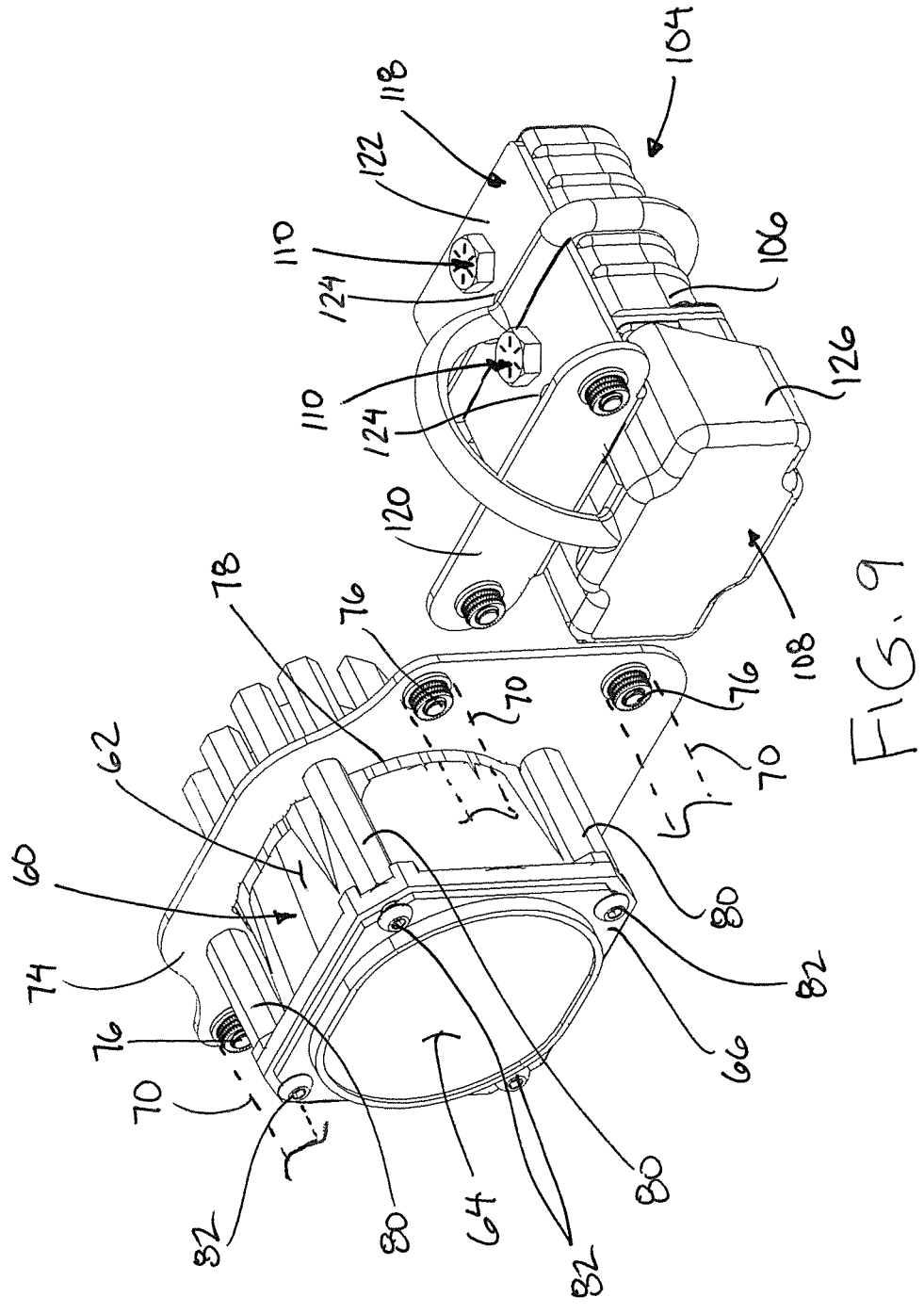
FIG. 9 is a perspective view of the light adapter plate supporting the lighting assembly thereon and the outlet adapter plate supporting the electrical outlet thereon when removed from the panel body.
Figure 10:
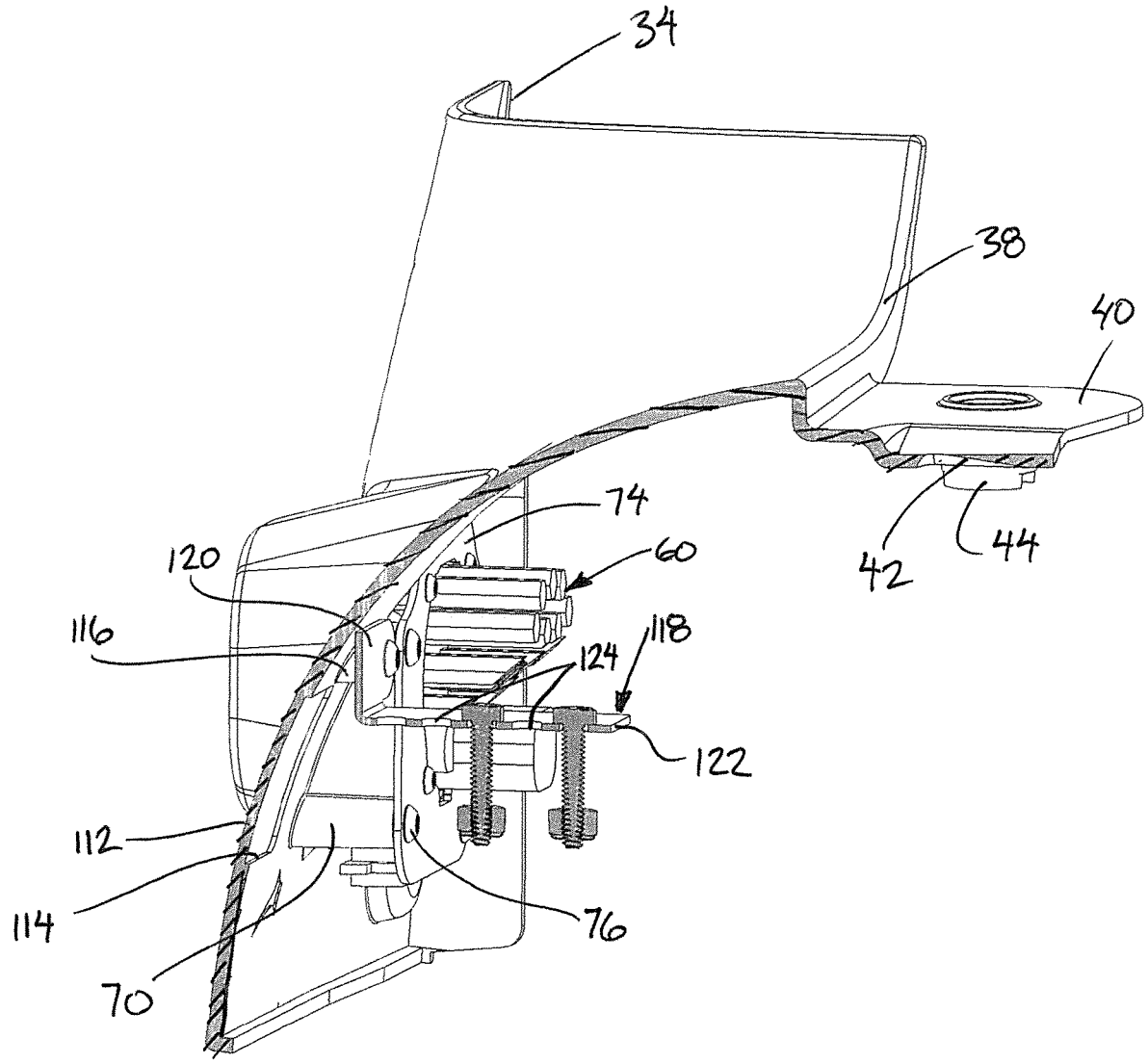
FIG. 10 is a partly sectional perspective view of the body panel apparatus in which the cross sectional plane extends through the breakout section and the outlet adapter plate according to the second embodiment of FIG. 6.

Referring to the accompanying figures there is illustrated a body panel apparatus generally illustrated by reference numeral 10. The body panel apparatus 10 is intended for mounting vehicular accessories in an externally accessible manner on the exterior body of a vehicle 12 as described in the following.

The body panel apparatus is available in a left-side configuration according to the first embodiment shown in FIGS. 1 through 5 and is available in a right-side configuration according to the second embodiment shown in FIGS. 6 through 10. In each instance, the apparatus 10 is intended to replace an existing body panel supported on existing vehicle mounts using the existing vehicle mounts such that the apparatus 10 forms part of the exterior body of the vehicle in a mounted position. The features in common with both embodiments will first be described.

Figure 11:
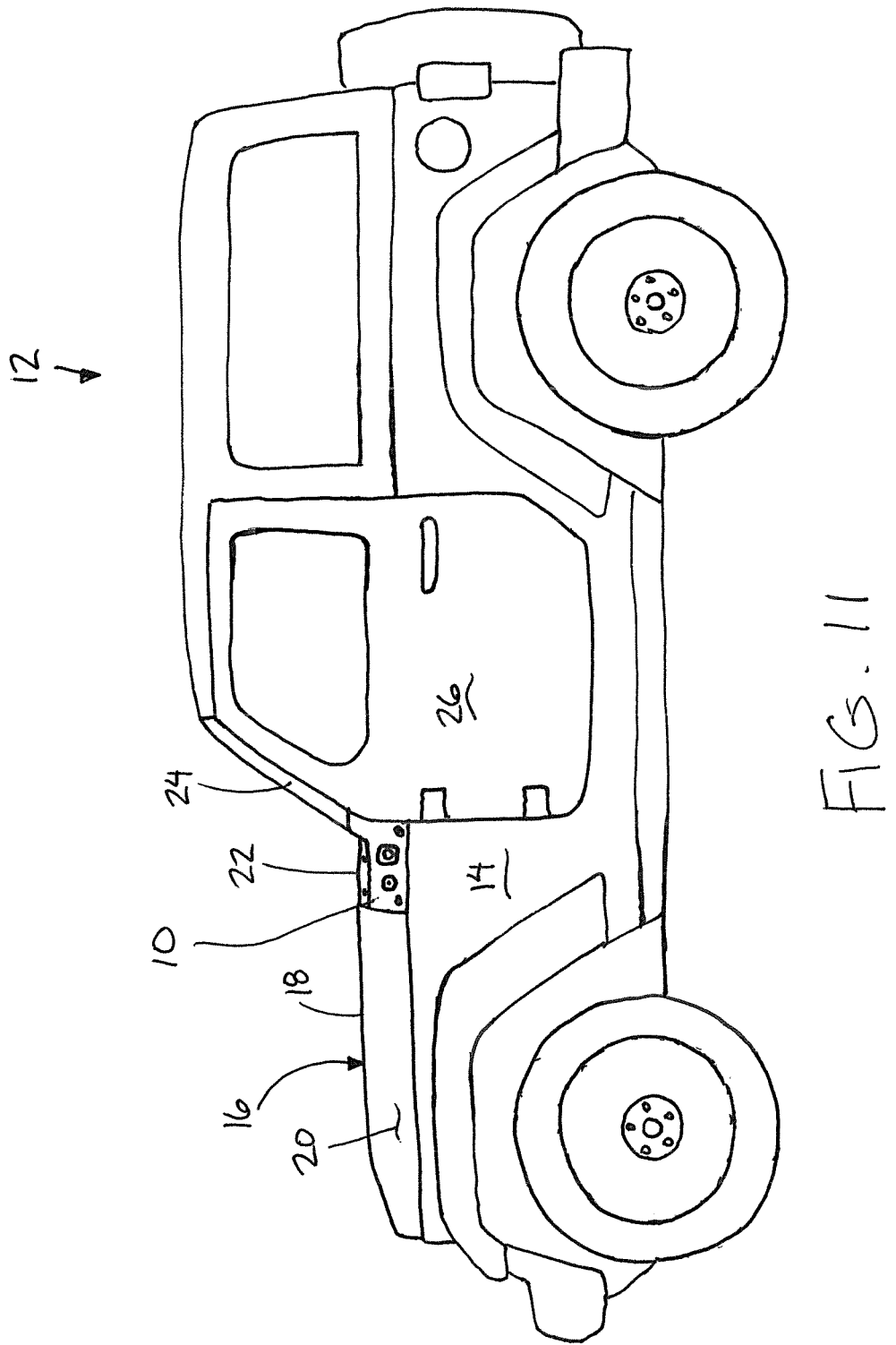
FIG. 11 is a schematic illustration of a vehicle showing a left side of the vehicle supporting the body panel apparatus according to the embodiment of FIG. 1 thereon.

According to the illustrated embodiments, the apparatus 10 is intended for use with a passenger vehicle 12 of the type illustrated in FIG. 11. In this instance, the body panel apparatus 10 replaces an existing body panel that is mounted at the side of the vehicle immediately above a corresponding front fender panel 14 that defines a wheel arch extending about a respective front wheel of the vehicle. The front fender panel has an upper boundary extending alongside a corresponding side boundary of a hood 16 of the vehicle. In this instance the hood has a top wall 18 spanning across the top of the engine compartment of the vehicle and side walls 20 curving laterally outwardly and downwardly at opposing sides of the hood for abutting the upper boundary of the front fender panels 14 at opposing sides of the vehicle in a closed position of the hood. The body panel apparatus 10 is mounted on the vehicle to extend rearwardly from the hood 16 of the vehicle in a continuous manner in alignment with the side walls 20 of the hood 16.

The vehicle further includes a cowl panel 22 mounted on the vehicle to span laterally across the vehicle at the rear edge of the top wall 18 of the hood 16 of the vehicle. A windshield extends upwardly and rearwardly from a rear edge of the cowl panel 22 in which the windshield is supported along laterally opposing sides by A-pillars 24 of the vehicle. Each apparatus 10 is formed at the rear side to extend upwardly towards and transition in a continuous manner with a respective one of the A-pillars 24 of the vehicle.

The vehicle is further provided with a door 26 at each side of the vehicle having a forward door edge that joins the rear edge of the respective front fender panel 14 along a bottom portion of the door and that joins the rear edge of the respective A-pillar 24 of the vehicle along an upper portion of the door. The apparatus 10 extends rearwardly from the respective side wall 20 of the hood to terminate at a rear boundary joining an intermediate portion of the forward edge of the door 26 of the vehicle.

Each apparatus 10 includes a panel body 30 forming a main body of the apparatus that (i) spans the length of the apparatus in the longitudinal direction between a front boundary 32 at the front of the apparatus and a rear boundary 34 at the rear of the apparatus, and (ii) spans the height of the apparatus between a bottom boundary 36 along the bottom of the apparatus and a top boundary 38 along the top of the apparatus. As described above, when the panel body 30 mounts in place of an existing panel on the vehicle according to FIG. 11, (i) the front boundary 32 is directly adjacent a rear boundary of a respective side wall 20 of the hood 16 of the vehicle, (ii) the rear boundary 34 is directly adjacent a front boundary edge of the respective door 26 of the vehicle, (iii) the bottom boundary 36 is directly adjacent a top boundary of the front fender panel 14 below it, and (iv) the top boundary 38 has a forward portion mounted directly adjacent a lateral boundary of the cowl panel 22 and a rearward portion extending above the forward portion to be mounted directly adjacent a bottom boundary of the A-pillar 24 of the vehicle.

Each apparatus 10 is mounted onto the vehicle using existing mounts of the vehicle. Accordingly, the panel body 30 is provided with a top flange 40 protruding inwardly from a forward portion of the top boundary 38 at a location recessed slightly below the forward portion of the top boundary 38 of the panel body. The top flange 40 is provided with a fastener slot 42 that is arranged for alignment with a suitable socket on the vehicle frame that is arranged to receive a threaded fastener therein. In this manner, the top flange 40 is aligned with the threaded socket on the vehicle frame so that a fastener extending through the fastener slot 42 can fasten the top flange 42 the vehicle frame.

The top flange 40 is further provided with two sockets 44 at longitudinally spaced positions within the top flange for receiving internally threaded mounting collars therein that are aligned with mounting apertures spaced apart within the corresponding end of the cowl panel. In a mounted position, the corresponding lateral end of the cowl panel overlaps the top flange 40 so that the topside of the cowl panel is substantially flush with the top side of the forward portion of the panel body 30. Threaded fasteners can then be received through the fastener apertures at the end of the cowl panel for mating connection with threaded mounting collars within the sockets 44 of the apparatus to form a second connection of the top flange 40 with the surrounding components of the vehicle.

The existing mounts on the vehicle 12 further comprise a pair of threaded sockets that are aligned with fastener apertures 46 formed in the panel body 30 at longitudinally spaced positions along the bottom boundary 36. In this manner, threaded fasteners can be inserted through the fastener apertures 46 in the bottom of the panel body to form a fastened connection between the bottom of the panel body and the underlying threaded sockets of the vehicle 12 to form a further connection between the apparatus 10 and the vehicle 12.

In the mounted position of the panel body 30 on the vehicle, the exterior surface 48 at the exterior side of the panel body forms a corresponding portion of the overall exterior body of the vehicle.

The panel body 30 includes a forward portion 50 spanning a height of the panel body 30 at the forward end between the bottom boundary 36 and a forward portion of the top boundary 38. The forward portion 50 of the exterior surface of the panel body is generally convex about a longitudinal axis that is parallel to a forward rolling direction of the vehicle. In this manner the forward portion 50 of the panel body is curved and sloped laterally outwardly and downwardly from the forward portion of the top boundary 38 to the bottom boundary 36.

The panel body 30 also includes a rearward portion 52 joined continuously with the forward portion 50 to span a full height of the apparatus between the bottom boundary 36 and the rearward portion of the top boundary 38 that transitions into the A-pillar 24 of the vehicle. The bottom of the rear portion 52 is generally upright and parallel to the forward rolling direction of the vehicle. Towards the upper end of the rear portion 52 of the panel body 30, the panel body has a somewhat convex exterior surface that is curved about an upright axis to transition into the exterior shape of the A-pillar above.

Each apparatus 10 further includes a light protrusion 54 integrally formed and mounted on the panel body 30 such that the protrusion projects laterally outward from the remainder of the exterior surface of the panel body 30 and terminates at a distal end spaced laterally outwardly from the entirety of the perimeter boundary of the panel body 30. The light protrusion includes an end surface 56 at the distal end which is oriented in a mounted position on the vehicle to be substantially vertical and parallel to the forward working direction of the vehicle while defining the outermost boundary of the apparatus in the lateral direction of the vehicle. The light protrusion 54 has a cross-sectional shape defining four sides in a generally square configuration which are sloped and tapered inwardly towards one another as the light protrusion extends outward towards the distal end. The exterior surface includes rounded corners forming a smooth transition between all of the four sides of the protruding shape as well as forming smooth and rounded transitions between all four sides and the remaining exterior surface of the panel body.

A light aperture 58 is centrally formed within the end surface 56 to span the majority of the surface area at the distal end of the light protrusion 54. In this manner, the light protrusion 54 is arranged to receive a lighting assembly 60 therein so that the light assembly can project light outwardly in a lateral direction of the vehicle through the light aperture 58 when the lighting assembly is mounted internally within the light protrusion 54 at the interior side of the panel body 30. More particularly, the light assembly 60 includes an external housing 62 extending in a longitudinal direction of the housing between a lens 64 at a forward end and an opposing rear end of the housing. The light assembly is supported by the apparatus so that the longitudinal direction of the housing is oriented laterally of the vehicle with the lens at the forward end of the housing being aligned with the light aperture 58 at the distal end of the light protrusion 54. The housing of the lighting assembly further includes a support flange 66 extending radially outward from the housing at the forward end of the housing about the full perimeter of the lens such that the flange lies parallel to the lens surface.

The light aperture 58 at the distal end of the light protrusion is sized to span a majority of the surface area of the lens so as not to interfere with projection of light outwardly through the lens of the light assembly. The light protrusion includes a rim 68 formed on the end surface 56 about the perimeter of the light aperture 58 in which the exterior surface about the light aperture is sloped inwardly toward the interior of the apparatus to terminate at an inner edge of the rim 68. The inner edge of the rim 68 extending about the perimeter of the light aperture 58 lies in a common plane oriented parallel to the end surface 56 of the light protrusion for abutment against the exterior surface of the lens 64 of the light assembly. In this manner, the end surface 56 and the rim 58 collectively wrap around the peripheral edge of the housing 62 of the light assembly that surrounds the lens 64 so that the housing 62 of the light assembly is fully concealed at the interior side of the apparatus when the rim 68 is abutted against the exterior of the lens.

To support the light assembly relative to the panel body, a plurality of light mounting posts 70 are formed on the interior side of the panel body to extend laterally inwardly relative to the surrounding interior surface of the panel body. The light mounting posts are moulded integrally with the panel body of the same plastic material so as to be formed continuously and seamlessly with the remainder of the panel body as a singular body of material. The light mounting posts in a mounted position extend horizontally inward perpendicularly to the forward direction of the vehicle and perpendicularly to the end surface 56 of the light protrusion. In the illustrated embodiment a set of four light mounting posts 70 are provided which are spaced apart about the perimeter of the light protrusion 54 in proximity to the four corners of the rectangular shape of the light protrusion. More particularly, two of the mounting posts 70 are positioned forwardly of the light protrusion 54 at vertically spaced apart positions in proximity to the top and bottom of the light protrusion, and two other mounting posts 70 are positioned rearwardly of the light protrusion at vertically spaced apart positions in proximity to the top and bottom of the light protrusion.

The light mounting posts 70 protrude inwardly from the interior surface of the panel body by different lengths such that the inner ends of the light mounting posts terminate at a common vertical plane that is parallel to the end surface 56 of the light protrusion and parallel to the lens of the light assembly mounted on the panel body. In the illustrated embodiment a reinforcing web 72 is connected between two of the posts. Additional webs or gussets may be provided to provide additional support to other posts if desired.

Each light mounting post 70 is further provided with a socket at the inner ends thereof which fixedly mounts an internally threaded insert therein in which the threaded insert is arranged to receive a threaded fastener therein as described in further detail below.

The apparatus further includes an adapter plate 74 which is mounted on the light mounting posts 70 to provide support for the lighting assembly. The adapter plate 74 has a polygonal perimeter shape defining a set of four corners of the plate that are aligned with the four light mounting posts 70 respectively. Fastener apertures are provided in alignment with each of the light mounting posts to receive suitable threaded fasteners 76 which fasten the adapter plate against the inner ends of the light mounting posts 70. The adapter plate is thus supported parallel to the end surface 56 of the light protrusion at a location spaced laterally inwardly from the inner surface of the region of the panel body immediately surrounding the light protrusion. The adapter plate 74 includes a rear aperture 78 centrally located within the adapter plate which is sized to receive a rear end portion of the housing 62 of the light assembly protruding through the aperture when the light assembly is carried on the adapter plate 74.

To support the light mounting assembly on the adapter plate, a set of four adapter posts 80 are mounted on the adapter plate 74 to protrude outwardly towards the end surface 56 in alignment with a set of mounting apertures located in the support flange 66 at the forward end of the housing of the lighting assembly. The adapter posts 80 are evenly spaced apart in the circumferential direction about the lens of the lighting assembly to align with the existing fastener apertures within the support flange 66 of the light assembly. The adapter posts are equal in length so that the support flange 66 is supported parallel to the adapter plate. A set of inner fasteners 82 are fastened through respective apertures in the adapter plate to form a threaded connection with an internally threaded socket at the inner end of the adapter posts 80 respectively. Similar threaded sockets at the outer ends of the adapter posts receive fasteners which are fastened through the apertures in the support flange of the light assembly for securing the light assembly fixedly to the adapter posts. Each adapter post 80 has a polygonal cross-sectional shape, for example a hexagonal perimeter shape along the length of the post to enable gripping with a tool when tightening the fasteners that secure the light assembly to the adapter posts and that secure the adapter posts to the adapter plate. The post length is arranged to support the lighting assembly so that the lens is abutted against the inner edge of the rim 68.

Typically, the light housing is supported on the adapter plate using the adapter post 80 as a first assembly step, followed by subsequent mounting of the adapter plate 74 onto the light mounting posts 70 that are integrally formed on the panel body.

Turning now more particularly to the first embodiment of the apparatus for mounting on the left side of the vehicle according to FIGS. 1 through 5, the apparatus in this instance is suited for use with a compressed air supply of the vehicle which includes an air compressor (not shown) having a supply line which supplies compressed air to an air coupler 84 that is mounted on the apparatus to be externally accessible. More particularly, the air coupler 84 includes an external socket 86 which enables the connecting nipple at the end of an auxiliary compressed air line to be releasably mounted therein. The air coupler 84 includes a rear stem 87 which is externally threaded and a connecting nipple 88 at the inner end of the air coupler 84 opposite from the external socket. When mounted on the apparatus 10, the connecting nipple 88 is intended to be supported at the interior side of the panel body for connection to the supply line of the air compressor mounted internally within the vehicle, for example within the engine compartment.

To support the air coupler 84, the first embodiment of the apparatus further includes a mounting socket 90 supported on the panel body 30 at a location forwardly of the light assembly. The mounting socket is integrally formed on the panel body in alignment with a socket opening 92 within the exterior surface at a location spaced forwardly of the light protrusion 54. Socket walls 94 in a cylindrical shape protrude inwardly from the inner side of the panel body in alignment with the socket opening to form a hollow cavity within the interior of the socket walls which is open to the exterior side of the panel body. The socket walls are cylindrical about an axis of the mounting socket which is horizontal and perpendicular to the forward working direction of the vehicle.

The socket walls terminate at an inner end at an end wall 96 forming an inner end surface of the hollow cavity of the mounting socket 90. The inner end wall is vertically oriented and parallel to the forward working direction of the vehicle in the mounted position of the apparatus on the vehicle. A central mounting aperture 98 is located centrally within the end wall 96 which is sized to receive the rear stem 87 of the air coupler therethrough. A threaded nut can be threaded onto the stem from the inner side of the panel body once the stem has been inserted through the mounting aperture to fixedly secure the air coupler 84 relative to the panel body. The socket walls 94 are sized to surround the external socket 86 of the air coupler with a radial gap between the air coupler and the socket walls about the full circumference thereof. The mounting of the external socket of the air coupler onto the inner end wall 96 ensures that the exterior socket is at least partly recessed relative to the exterior surface of the panel body immediately surrounding the socket opening 92.

In the mounted position, the interior nipple 88 protrudes inwardly into the interior of the vehicle from the end wall 96 which is in turn spaced inwardly from the inner surface of the panel body immediately surrounding the mounting socket 90.

A drain hole 100 communicates through the cylindrical socket wall 94 at the bottom of the mounting socket in proximity to the inner end wall 96 so that any precipitation collecting within the cavity of the mounting socket drains through the drain hole 100.

One or more gussets 102 may be connected between the socket wall 94 and an adjacent portion of the inner surface of the panel body at spaced positions about the socket for structural support.

Turning now more particularly to the second embodiment of the apparatus for mounting on the right side of the vehicle according to FIGS. 6 through 10, the apparatus 10 in this instance is suited for use with an electrical outlet assembly 104 which provides an externally accessible connection for supplying electrical power to a variety of devices external of the vehicle. The electrical outlet assembly 104 includes a housing 106 which extends longitudinally from an electrical connector 108 at the front end of the housing to an opposing rear end of the housing. The housing 106 is intended to be mounted on the panel body so that the longitudinal direction of the housing is oriented horizontally and perpendicularly to the forward rolling direction of the vehicle. The electrical connector 108 at the forward end defines an arrangement of electrical pins or electrical sockets that receive pins for forming an electrical connection with the plug of an electrical cord and the like for example. The housing 106 of the electrical outlet assembly further includes a pair of longitudinally spaced apart mounting apertures 110 enabling mounting fasteners to be received therein for fastening the housing to a suitable mounting structure.

The panel body 30 in this instance includes a breakout section 112 which can be cut and removed when access to an internally mounted electrical outlet assembly is desired. Alternatively, if the user chooses not to mount an electrical outlet assembly on the panel body, the breakout section 112 can remain intact so that the corresponding exterior surface remains uninterrupted. The perimeter boundary of the breakout section 112 is defined by a line of weakness 114 integrally moulded into the plastic material at the interior surface of the panel body.

The exterior surface of the panel body includes a first portion spanning the exterior of the breakout section 112 and a second portion immediately surrounding the boundary of the breakout section 112. The breakout section is arranged so that the first and second portions of the exterior surface extend continuously and seamlessly with one another at the exterior of the panel body so that the presence of the breakout section cannot be detected from the exterior side of the panel body when the breakout section 112 is not used.

When it is desired to make use of an electrical outlet assembly on the right side panel body, a suitable cutting tool can be used to cut through the panel body at the line of weakness 114 about the full boundary of the breakout section so that the breakout section can be permanently removed from the panel body. In the illustrated embodiment, the entirety of the breakout section 112 is moulded so that the thickness of the plastic material between the exterior surface and the interior surface is reduced about the entirety of the breakout section. The line of weakness in this instance is identified as the stepped boundary between the thinner material of the breakout section and the thicker material of the surrounding area. A shoulder is formed at the interior side about the full boundary of the breakout section between the thinner material of the breakout section and the thicker material of the immediately surrounding panel body.

In order to mount the electrical outlet assembly at the interior of the panel body, the panel body is provided with a plurality of outlet mounting posts 116 integrally formed together with the plastic material of the panel body to be seamless and continuous with the panel body while protruding inwardly into the interior of the vehicle relative to the surrounding inner surface of the panel body. The outlet mounting posts 116 are spaced apart in the longitudinal direction of the vehicle at a location above the breakout section 112 so that the posts extend horizontally and perpendicularly to the forward rolling direction of the vehicle. Each outlet mounting post 116 includes a socket formed at the inner end thereof which receives an insert fixedly mounted therein defining an internally threaded socket for receiving suitable fasteners therein similarly to the light mounting posts of the previous embodiment.

An outlet adapter member 118 is fastened onto the outlet mounting posts 116 and provide a structure onto which the housing 106 of the electrical outlet assembly can be supported. The outlet adapter includes a first flange 120 including spaced apart mounting apertures formed therein which receive mounting fasteners for alignment with the outlet mounting posts 116 respectively so that the first flange can be fastened fixedly relative to the panel body. The outlet adapter member 118 further includes a second flange 122 mounted perpendicularly to the first flange to extend horizontally and laterally inwardly towards the interior of the vehicle in proximity to the upper boundary of the breakout section 112. A set of mounting apertures 124 are spaced apart from one another in a row along the length of the second flange 122 so that the row extends inwardly into the vehicle. The apertures are provided at a suitable spacing for alignment with the corresponding mounting apertures 110 of the housing 106 of the electrical outlet assembly. The mounting apertures permit the housing 106 to be mounted using suitable fasteners penetrated through the mounting apertures in the second flange of the outlet adapter member and through the mounting apertures in the outlet housing 106. The even spacing of the mounting apertures permits the housing 106 to be mounted at a plurality of different longitudinal positions along the second flange 122 corresponding to different distances of the electrical outlet assembly from the inner surface of the panel body.

In the mounted position, the connector 108 at the forward end of the outlet housing 106 is supported by the outlet adapter member 118 to be approximately centred in height and in the forward direction of the vehicle relative to the opening formed by removal of the breakout section 112 while remaining spaced inwardly into the interior of the vehicle relative to the inner surface of the panel body. This ensures a perimeter gap between the forward end of the housing 106 and the perimeter boundary of the opening formed by removal of the breakout section 112 about the full perimeter of the opening.

A suitable cover 126 can be removably mounted over the forward end of the outlet housing 106 to protect the electrical connector 108 from precipitation and debris when not in use. The perimeter gap between the boundary of the breakout section 112 and the forward end of the electrical outlet assembly provides clearance for mounting and removing the cover 126 to partly surround the forward end of the outlet housing 106.

Since various modifications can be made in the invention as herein above described, and many apparently widely different embodiments of same made, it is intended that all matter contained in the accompanying specification shall be interpreted as illustrative only and not in a limiting sense.

The invention claimed is:

1. A body panel apparatus for mounting a lighting assembly onto a vehicle in place of an existing panel mounted on existing mounts of the vehicle wherein the lighting assembly includes a housing having a lens at a forward end of the housing and a mounting flange with fastener apertures therein about the lens at the forward end of the housing, the body panel apparatus comprising:

a panel body having an exterior surface and an opposing interior surface;

a plurality of panel mounts on the panel body arranged to mount the panel body on said existing mounts of the vehicle such that said exterior surface forms a portion of an exterior body surface of the vehicle;

a light protrusion formed on the panel body to protrude outwardly from the exterior surface towards an end surface at a distal end of the light protrusion;

a light aperture formed in the end surface of the light protrusion;

a plurality of light mounting posts integrally formed on the interior surface of the panel body to protrude inwardly from the interior surface at spaced positions about the light aperture;

a light adapter plate mounted onto the light mounting posts at a location spaced inwardly from the light aperture in the end surface of the light protrusion; and a plurality of adapter posts mounted on the light adapter plate to extend outwardly towards distal ends in proximity to the end surface of the light protrusion such that the adapter posts are arranged to support mounting flange of the lighting assembly thereon using fasteners coupled to the adapter posts through the fastener apertures in the mounting flange when the lens of the lighting assembly is adjacent to and aligned with the light aperture;

wherein the apparatus is arranged for use with an electrical outlet including a housing having an electrical connection at a forward end of the housing and mounting apertures in the housing at a location rearwardly of the electrical connection, the body panel apparatus further comprising:

a breakout section formed in the panel body and defined by a line of weakness formed on the interior surface to extend about a boundary of the breakout section;

a plurality of outlet mounting posts integrally formed on the interior surface of the panel body to protrude inwardly from the interior surface in proximity to the breakout section; and an outlet adapter plate having a first flange mounted onto the outlet mounting posts and a second flange protruding inwardly from the interior surface of the panel body, the second flange including a plurality of mounting apertures therein arranged for alignment with the mounting apertures in the housing of the electrical outlet such that the second flange is arranged to support the housing of the electrical outlet fastened thereon when the electrical connection at the forward end of the housing is adjacent to and aligned with the breakout section.

2. The apparatus according to claim 1 wherein the exterior surface of the panel body includes a first portion spanning an exterior of the breakout section and a second portion surrounding the breakout section, the exterior surface of the panel body being smooth, continuous and uninterrupted from the first portion to the second portion of the exterior surface.

3. The apparatus according to claim 1 wherein the breakout section is spaced forwardly of the light protrusion in a forward rolling direction of the vehicle.

4. The apparatus according to claim 1 wherein the outlet adapter plate is arranged to support the electrical outlet thereon such that the electrical connection at the forward end of the housing is spaced inwardly from the interior surface of the panel body.

5. The apparatus according to claim 1 wherein the mounting apertures in the second flange of the outlet adapter plate are aligned in a row extending inwardly from the panel body such that the outlet adapter plate is arranged to support the electrical outlet thereon at an adjustable spacing relative to the panel body.

6. The apparatus according to claim 1 wherein the outlet mounting posts are located above the breakout section of the panel body.

7. A body panel apparatus for mounting an electrical outlet onto a vehicle in place of an existing panel mounted on existing mounts of the vehicle wherein the electrical outlet includes a housing having an electrical connection at a forward end of the housing and mounting apertures in the housing at a location rearwardly of the electrical connection, the body panel apparatus comprising:

a panel body having an exterior surface and an opposing interior surface, the panel body including a breakout section defined by a line of weakness formed on the interior surface to extend about a boundary of the breakout section;

a plurality of panel mounts on the panel body arranged to mount the panel body on said existing mounts of the vehicle such that said exterior surface forms a portion of an exterior body surface of the vehicle;

a plurality of outlet mounting posts integrally formed on the interior surface of the panel body to protrude inwardly from the interior surface in proximity to the breakout section; and an outlet adapter plate having a first flange mounted onto the outlet mounting posts and a second flange protruding inwardly from the interior surface of the panel body, the second flange including a plurality of mounting apertures therein arranged for alignment with the mounting apertures in the housing of the electrical outlet such that the second flange is arranged to support the housing of the electrical outlet fastened thereon when the electrical connection at the forward end of the housing is adjacent to and aligned with the breakout section.

8. The apparatus according to claim 7 wherein the exterior surface of the panel body includes a first portion spanning an exterior of the breakout section and a second portion surrounding the breakout section, the exterior surface of the panel body being smooth, continuous and uninterrupted from the first portion to the second portion of the exterior surface.

9. The apparatus according to claim 7 further comprising:

a light protrusion formed on the panel body to protrude outwardly from the exterior surface towards an end surface at a distal end of the light protrusion;

a light aperture formed in the end surface of the light protrusion; and a mounting arrangement arranged to support a lighting assembly in operative relation to the light aperture;

wherein the breakout section is spaced forwardly of the light protrusion in a forward rolling direction of the vehicle.

10. The apparatus according to claim 7 wherein the outlet adapter plate is arranged to support the electrical outlet thereon such that the electrical connection at the forward end of the housing is spaced inwardly from the interior surface of the panel body.

11. The apparatus according to claim 7 wherein the mounting apertures in the second flange of the outlet adapter plate are aligned in a row extending inwardly from the panel body such that the outlet adapter plate is arranged to support the electrical outlet thereon at an adjustable spacing relative to the panel body.

12. The apparatus according to claim 7 wherein the outlet mounting posts are located above the breakout section of the panel body.

* * * * *